United States Patent [19]

Benedikt et al.

[11] Patent Number: 5,315,875
[45] Date of Patent: May 31, 1994

[54] PRESSURE SENSOR FOR DETECTING THE PRESSURE IN THE COMBUSTION CHAMBER OF INTERNAL-COMBUSTION ENGINES

[75] Inventors: Walter Benedikt, Kornwestheim; Manfred Vogel, Ditzingen-Heimerdingen; Werner Herden, Gerlingen; Johann Konrad, Tamm; Wolfgang Schmidt, Vaihingen/Enz; Josef Tosch, Schwieberdingen; Matthias Kuessel, Korntal-Muenchingen, all of Fed. Rep. of Germany

[73] Assignee: Robert Bosch GmbH, Stuttgart, Fed. Rep. of Germany

[21] Appl. No.: 838,237

[22] PCT Filed: Jun. 27, 1991

[86] PCT No.: PCT/DE91/00526
§ 371 Date: Mar. 3, 1992
§ 102(e) Date: Mar. 3, 1992

[87] PCT Pub. No.: WO92/01914
PCT Pub. Date: Feb. 6, 1992

[30] Foreign Application Priority Data

Jul. 18, 1990 [DE] Fed. Rep. of Germany ....... 4022782

[51] Int. Cl.$^5$ .............................. G01L 7/08; G01L 9/06
[52] U.S. Cl. ........................................ 73/706; 73/115; 73/721; 73/727; 338/4
[58] Field of Search ................. 73/726, 706, 708, 727, 73/720, 721, DIG. 4, 754, 862.382, 862.632, 862.634, 115; 338/4, 42

[56] References Cited

U.S. PATENT DOCUMENTS

| | | | |
|---|---|---|---|
| 3,204,463 | 9/1965 | Taber | 73/726 |
| 4,567,395 | 1/1986 | Pundarika | 73/115 |
| 4,620,438 | 4/1986 | Gazzano | 73/115 |
| 5,095,741 | 3/1992 | Bartig et al. | 73/115 |

FOREIGN PATENT DOCUMENTS

| | | |
|---|---|---|
| 886783 | 11/1971 | Canada . |
| 0179278 | 9/1985 | European Pat. Off. . |
| 3125640 | 1/1983 | Fed. Rep. of Germany . |
| 2626670 | 4/1989 | France . |

*Primary Examiner*—Donald O. Woodiel
*Attorney, Agent, or Firm*—Michael J. Striker

[57] ABSTRACT

A pressure sensor for detecting pressure in a combustion chamber of internal combustion engines has a housing, a sensor element composed of a piezoresistive material and arranged in the housing, a diaphragm, a punch introducing a pressure to be determined onto the sensor element and located between the diaphragm and the sensor element. The punch has a counterbearing, a hybrid has a base, and a preprocessing circuit has electronic components. The sensor element, the hybrid with its base and the electronic components of the preprocessing circuit are located on the counterbearing of the punch.

15 Claims, 6 Drawing Sheets

PRESSURE SENSOR FOR DETECTING THE PRESSURE IN THE COMBUSTION CHAMBER OF INTERNAL-COMBUSTION ENGINES

The present invention relates to a pressure sensor.

More particularly, the present invention relates to a pressure sensor in which a sensor element is composed of a piezoresistive material and arranged in a housing. In the case of such a pressure sensor, known from German Offenlegungsschrift 31 25 640.6, the piezoresistive measuring elements, such as for example thick-film resistors of cement, contactive plastic or platinum, are printed on a base. The resistor element and the base are arranged as close as possible to the pressure chamber in order to be able to determine the pressure prevailing there. Furthermore, the measuring signal is passed with the aid of electric leads to an electronic evaluation circuit arranged outside the housing of the pressure sensor. As a result, the piezoresistive elements and the electronic components have to be elaborately connected to one another with the aid of insulated pieces of wire. Since the piezoresistive measuring element is exposed directly to the pressure, it is also exposed to the high temperatures prevailing in the combustion chamber. The flames spread there at a temperature of about 2000° C., whereby stresses can occur in the housing As a result, the pressure signal is falsified by the high temperatures.

Furthermore, European Preliminary Published Specification 85 111 895.0 discloses a pressure sensor in which the thick-film resistor is arranged on the bottom of a base. However, this pressure sensor is intended only for determining the pressure in distributor pumps. The high temperatures prevailing in the combustion chamber would falsify the measuring signal in the case of this design as well.

SUMMARY OF THE INVENTION

Accordingly, it is an object of the present invention to provide a pressure sensor for detecting pressure in a combustion chamber of internal combustion engines which avoids the disadvantages of the prior art.

In keeping with these objects and with others which will become apparent hereinafter, one feature of the present invention resides, briefly stated, in a pressure sensor in which between a diaphragm and a sensor element there is arranged a punch which introduces a pressure to be determined onto the sensor element, and the sensor element and a hybrid with its base and the electronic components of the preprocessing circuit arranged thereupon are located on a counterbearing of the punch.

When the pressure sensor is designed in accordance with the present invention, it has the advantage that the piezoresistive measuring element is relatively far away from the combustion chamber and the high temperatures prevailing there, so that the measuring signal is not falsified by the temperatures prevailing in the combustion chamber. Due to the arrangement of the piezoresistive measuring element and the hybrid on the counterbearing of the punch, standard bonding techniques tried in practice can be used for connecting the electronic components and the piezoelectric elements. The various materials adapted to the respective printing techniques can be used as material for the base of the hybrid, which can also be used at the same time in an advantageous way as base for the thick-film resistors and semiconductor components. The hybrid can be printed in one operation simultaneously with the conductor tracks and the contact surfaces for the piezoresistive effect The entire hybrid, including the electronic components for signal pre-processing and the piezoresistive elements, can be checked before fitting into the sensor housing As a result, simple assembly of the pressure sensor is possible If the piezoresistive measuring element and the electronic components are on a common base, and if these components are arranged on the side of the counterbearing facing the diaphragm, its overall length can be reduced The hybrid can also be fitted into the housing of the pressure sensor in the axial direction of the latter without elaborate design modifications. If, for example, a flexible Kapton film is used, the piezoresistive measuring elements and electronic components can likewise be printed on in a single operation. Furthermore, this type of design produces a particularly narrow form of the pressure sensor. The pressure sensor can be produced inexpensively. On account of the spatial arrangement, in particular due to the arrangement on the same hybrid in direct proximity to one another, virtually the same temperature prevails with respect to the electronic components and with respect to the piezoresistive elements. As a result, it is possible to dispense with elaborate measures for temperature compensation. A functional trimming of the piezoresistive measuring elements can be effected by simple conventional laser scoring or laser trimming of the resistors. With the aid of electronic components it is possible to allow a compensation of the systematic temperature response of the piezoelectric measuring elements. In addition, it is possible for the electrical terminal of the measuring elements not to be connected to the housing leads, whereby a potential-free design of the sensor is possible and consequently the measuring signal is transmitted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
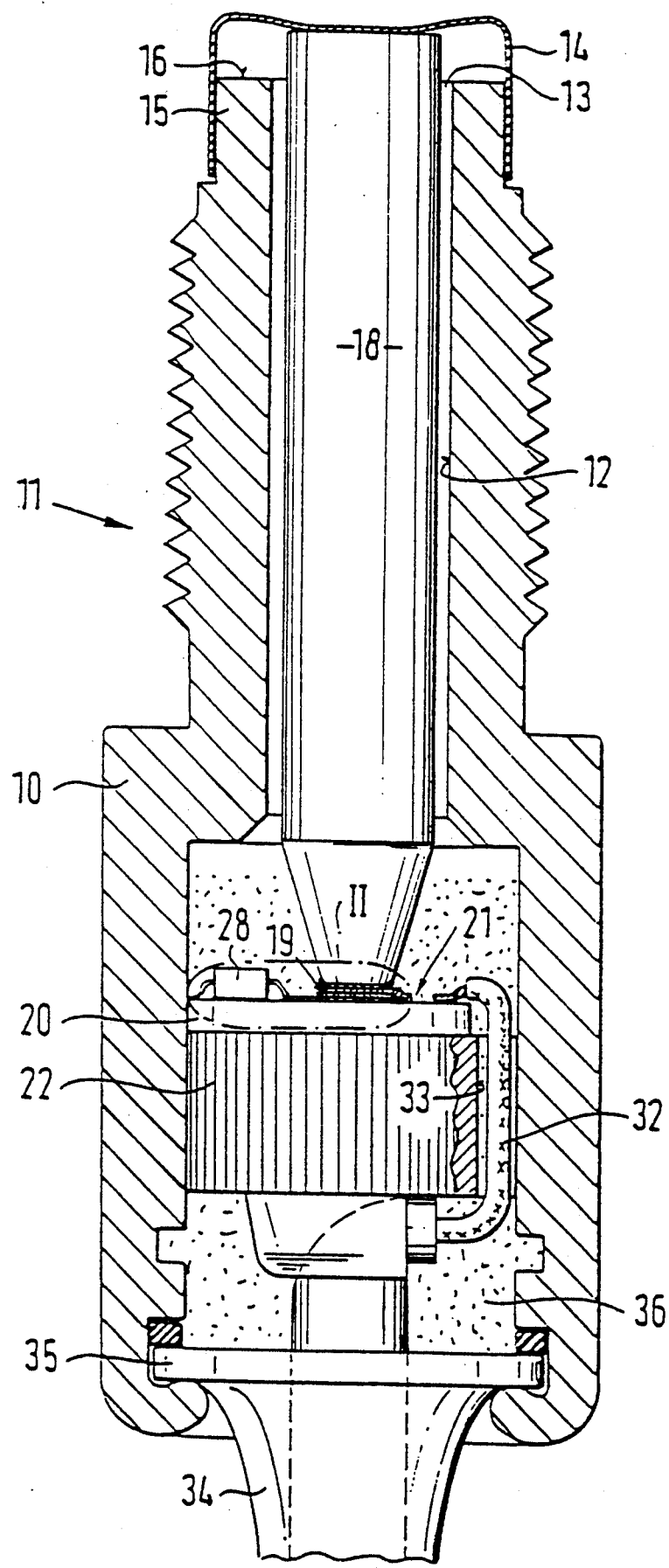
FIG. 1 shows a section through a pressure sensor.

In FIG. 1, 10 denotes the housing of a pressure sensor 11 for determining the pressure in the combustion chamber of an internal-combustion engine. It has a central, continuous stepped bore 12. The opening 13 of the housing 10 facing the combustion chamber is closed off by a diaphragm 14. The diaphragm 14 is designed as a so-called cap diaphragm. The edge of the diaphragm 14 is bent around and pushed over the end of the shank 15 of the housing 10. As a result, the diaphragm 14 sits firmly on the housing 10 but, in order to ensure a mobility of the diaphragm 14, does not bear directly against the end face 16 of the shank 15. As a result, the bending region of the diaphragm 14 can move freely The diaphragm 14 is welded onto the shank 15 in the region of the edge. The diaphragm 14 is formed particularly advantageously from a superalloy, that is to say from an alloy of, for example, 50% Ni, 20% Cr, 20% Fe. Against the middle area of the diaphragm 14 there bears with its one end a punch 18, which with its other end bears against a piezoresistive measuring element 19. Piezoresistive measuring elements are to be understood as elements which change their resistance value under the effect of pressure. For this, thick-film resistors may be used for example. As materials for this, cement, contactive plastic or platinum etc. can be used. The measuring element 19 is printed onto the base 20 of a hybrid 21. A hybrid is normally to be understood as a base having printed-on circuit parts, such as for example resistors etc., conductor tracks and an IC (integrated circuit), which is placed on the base and is bonded to the circuit parts, for example by bonding wires. The punch 18 itself may consist of glass ceramic, in order thereby to ensure a good thermal insulation between the diaphragm, that is to say between the pressure chamber of which the pressure is to be determined, and the piezoresistive measuring element. The end of the punch 18 facing the hybrid 21 may be conically designed, so that its end has approximately the diameter of the measuring element 19. This makes it possible to guide the punch 18 in the bore 12, but on the other hand to limit the area of pressure transfer to the size of the measuring element 19. The base 20 of the hybrid bears furthermore against a counterbearing 22, pressed into the bore 12.

Figure 2:
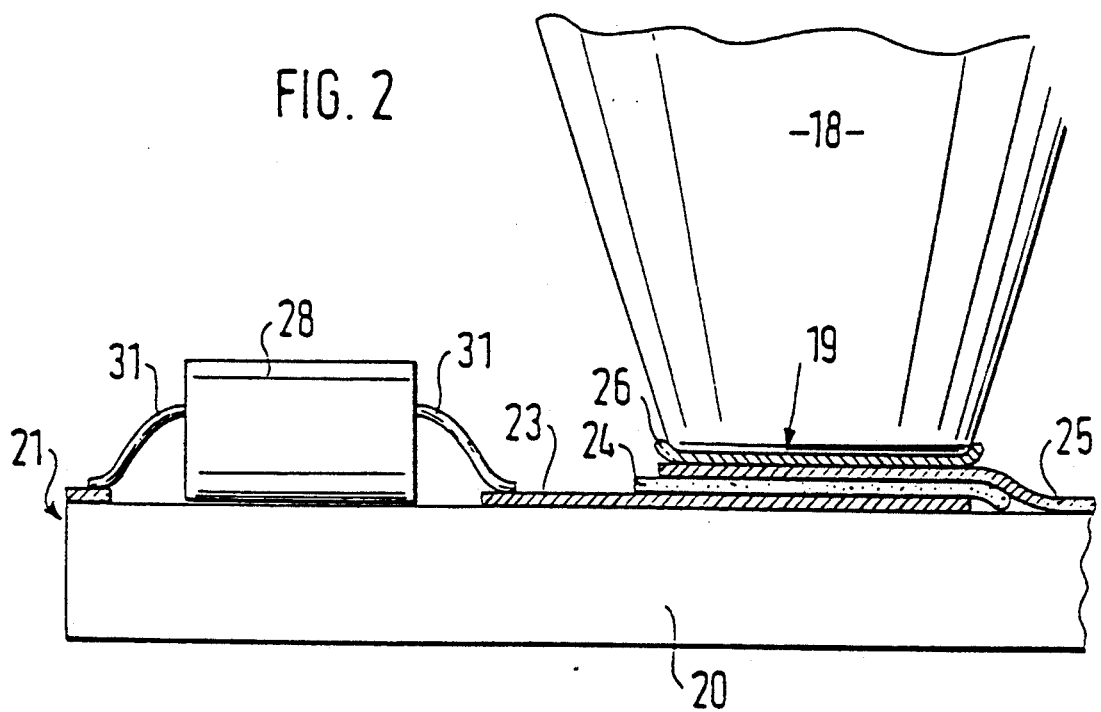
FIG. 2, FIG. 3a, FIG. 3b each show a detail.
Figure 3A:
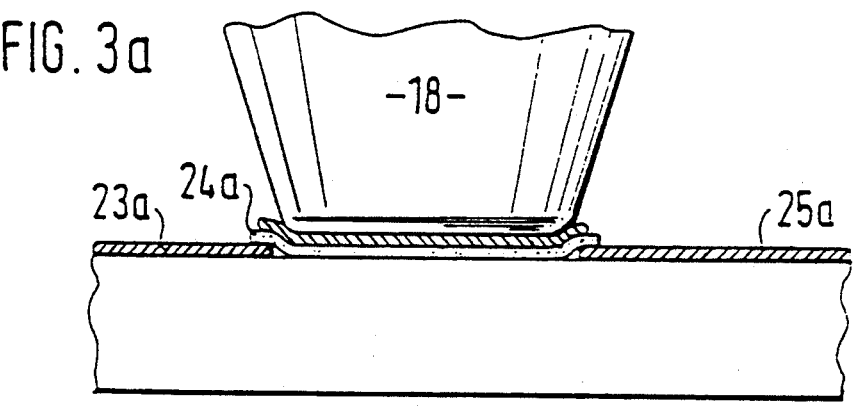
Figure 3B:
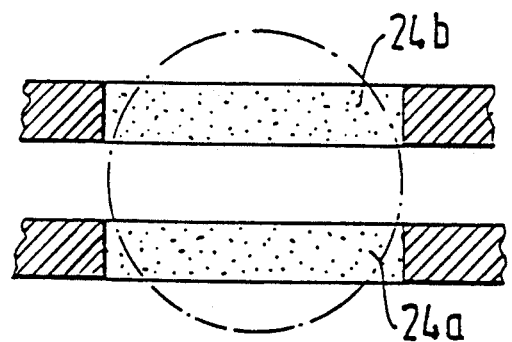
Figure 4:
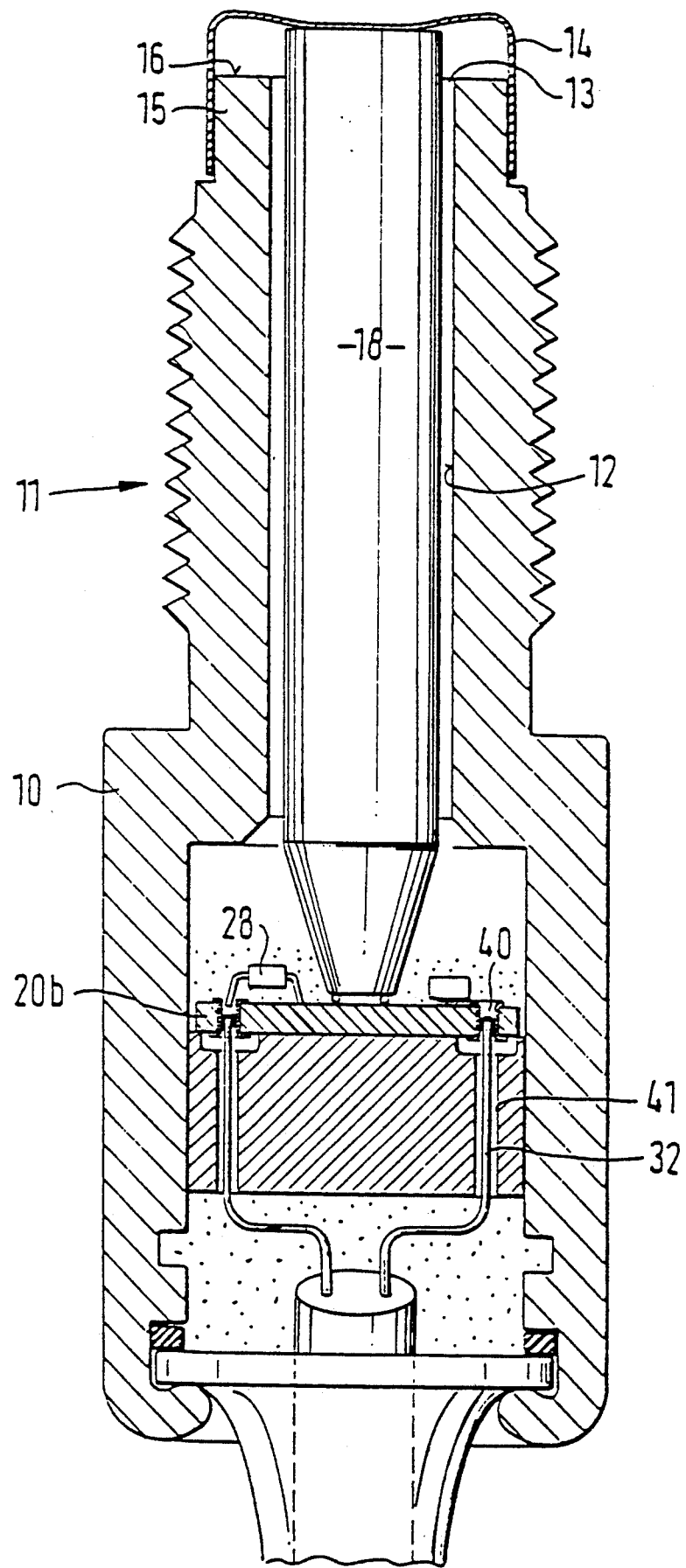
FIG. 4 to FIG. 7 each show a modification of the exemplary embodiment according to FIG. 1.

The hybrid 21 and the end of the punch 18 are shown in more detail in FIGS. 2, 3a and 3b. The base 20 consists of an $Al_2O_3$ substrate layer, on which a first contact layer 23 is printed. In a following printing operation, the piezoresistive film 24 and subsequently the second conductor track 25 are printed onto the first conductor track 23. The end of the punch 18 is fastened on the second conductor track 25 with the aid of a glass-like mass 26, in order thereby to permit a uniform force introduction onto the resistor element 24 and to fix the punch. Furthermore, the electronic components 28, such as for example resistors, transistors etc., are arranged on the base 20 of the hybrid 21. The electronic semiconductor components 28 and the conductor tracks are bonded with the aid of bonding wires 31. The output of the preprocessing electronics is connected with the aid of a lead 32 to an evaluation circuit and control device (not shown) of the internal-combustion engine, which are outside the sensor. For this, in the counterbearing 22 there is formed a continuous bore 33, which runs axially parallel to the bore 12 and in which the outgoing lead 32 is guided. The lead 32 is fastened in a grommet 34 of the cover 35 closing off the bore 12. Instead of a bore 33, a segment may also be cut out on the counterbearing 22 for guiding through the lead 32.

For protection against harmful environmental influences, such as for example moisture, the bore 12 is filled in the region of the electronic components 28 and/or in the region between the counterbearing 22 and the cover 35 with a casting compound 36.

In FIG. 2, the resistors 24 are printed in the direction of the current, for which a very high-impedance resistive paste should be used. As a result, a greater measuring signal is obtained with an introduced force of the same magnitude in comparison with conventional arrangements.

In the design according to FIG. 3a, the resistors 24a are printed transversely to the direction of the current on the base 30 of $Al_2O_3$ substrate of the hybrid 21. In a modification of the design according to FIG. 2, in FIG. 3a the first conductor track 23a and the second conductor track 25a are printed onto the base 20. The resistive film 24a is printed on between the two ends of the conductor tracks 23a, 25a. The respective ends of the resistive film and of the first conductor track 23a or the second conductor track 25a overlap in each case. However, this area of overlap lies outside the force-transforcing region of the punch 18. As can be seen from FIG. 3b, it is also possible to print a plurality of resistors onto the base as part of a so-called Wheatstone bridge circuit. In this arrangement, in each case two opposite resistors of the bridge circuit should be located in the force-introducing region of the punch 18, whereas the two other resistors are to be printed on in the direct vicinity of the resistors but in a region in which the force introduced by the punch 18 is not effective. The resistors 24a, 24b printed on in the region of force introduction as well as the two resistors in the vicinity are to be realised using the same technology, so that an approximately identical temperature behaviour as well as a long-term stability of the resistors is obtained. This form of arrangement of the resistors can be realised particularly simply by the thick-film technique. Due to the good temperature behaviour, it is also possible to dispense with an elaborate a.c. voltage amplifier as preprocessing electronics. As a result, only a d.c. voltage amplifier, comprising just a few resistors and an operational amplifier, need be arranged on the base of the hybrid. Since only a few components are necessary for the preprocessing circuit, the hybrid is relatively small in construction and consequently the cross-section of the pressure sensor can also be kept relatively small. This design consequently results in a combustion chamber sensor of low overall volume which is of a relatively simple and inexpensive construction.

Instead of leading off the measuring signal from the edge of the hybrid with the aid of the lead 32 and the bore 33, it is also possible to provide bores 40 in the base 20b of the hybrid 21. For this, bores 41 are also to be formed in the counterbearing 22. Then the lead 32 is led through these bores 40, 41 to the electric components 28 of the hybrid 21 or their conductor tracks. For this, conductor tracks of the hybrid are advantageously led through the bores 40 and contacted with the lead 32 on the underside of the base 20b.

Figure 5:
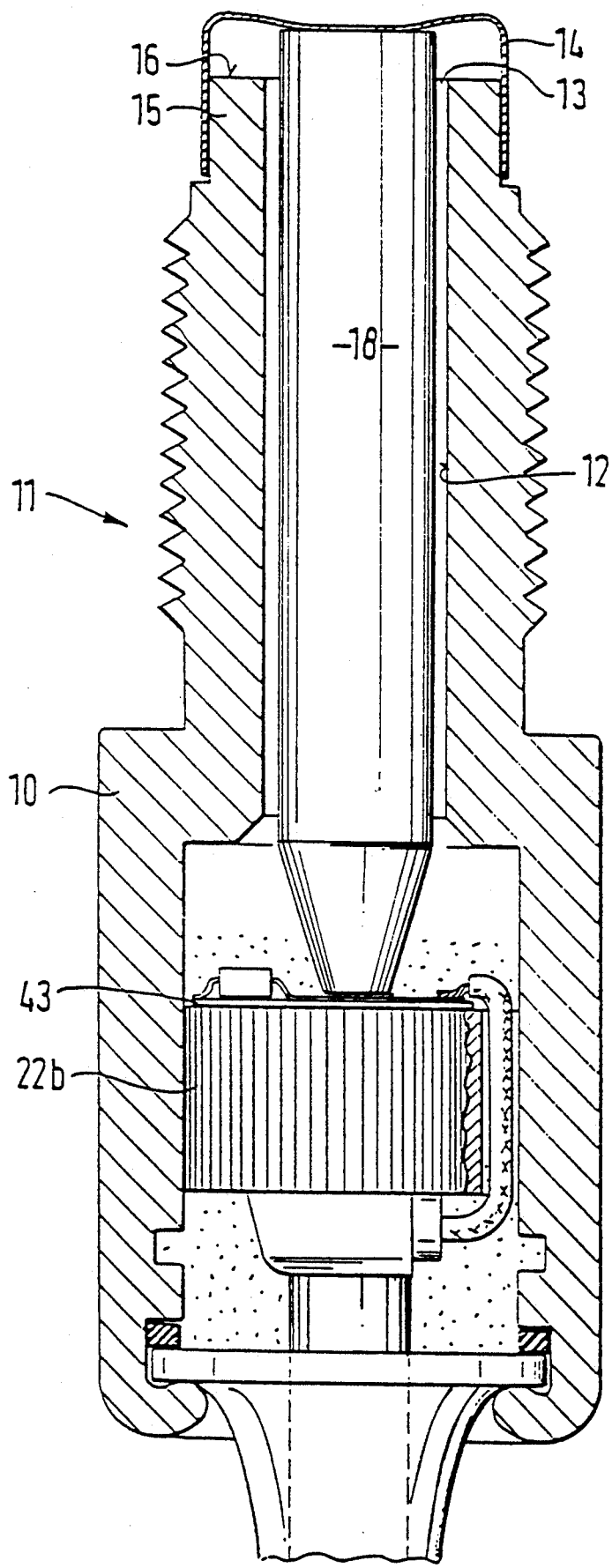
Figure 6:
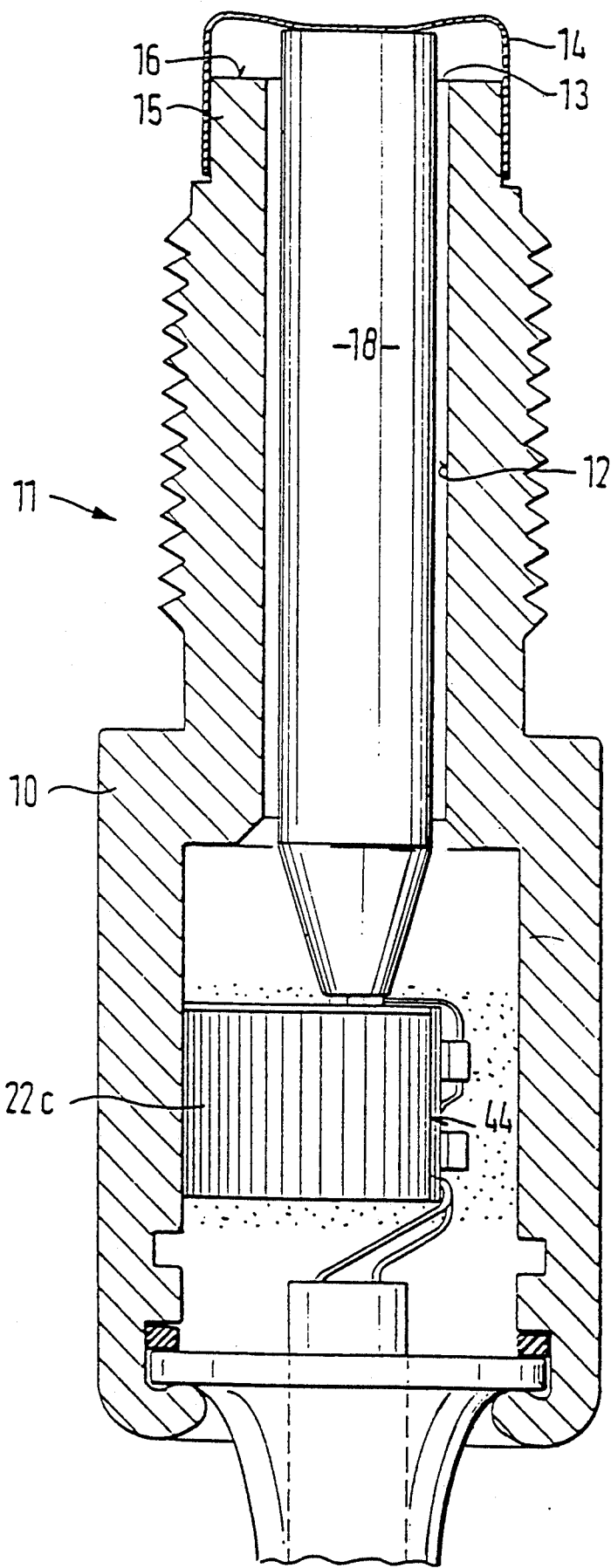
Figure 7:
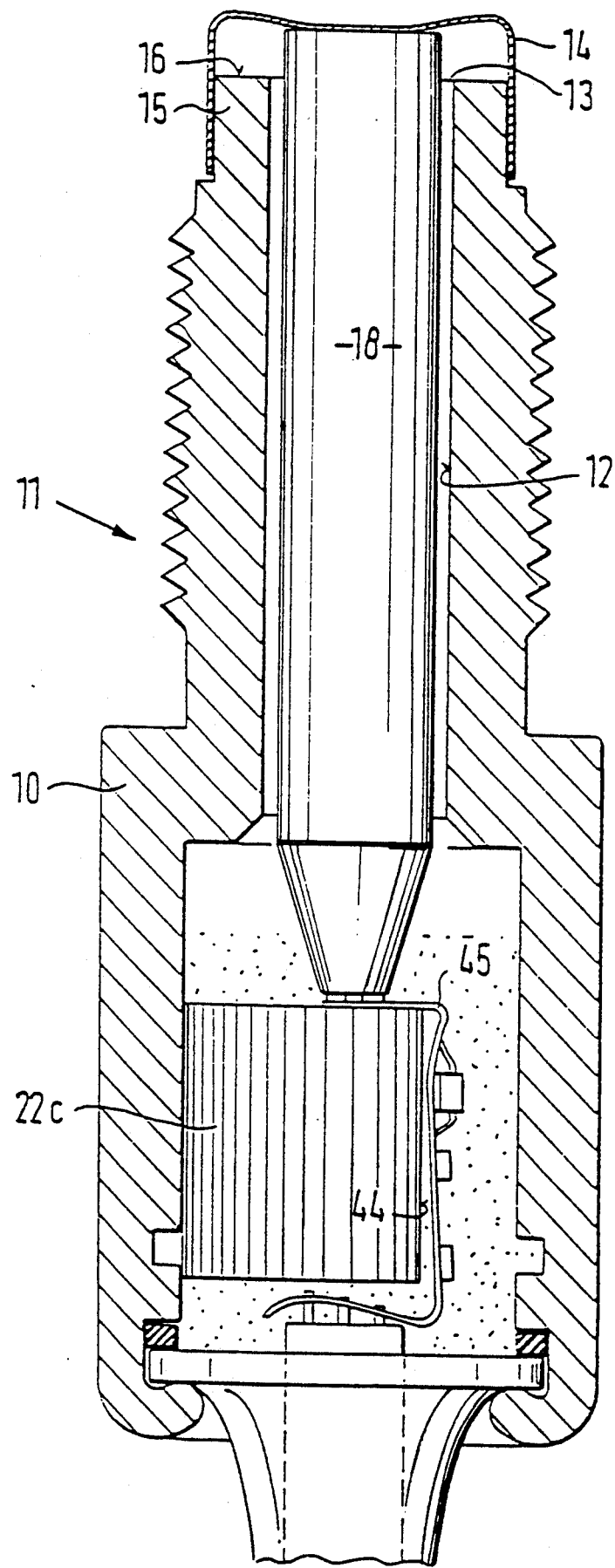

The designs according to FIGS. 5 to 7 represent special designs of the base 20 of the hybrid 21 and the arrangement of the electronic components 28 of the hybrid 21. In FIG. 5, the electronic components 28 of the hybrid 21 are applied here directly on the metallic counterbearing 22b of metallic material As material of the counterbearing SiCrAl may be used for example. For this, the counterbearing 22b is electrically insulated on the side facing the punch 18 by a glass layer 43, applied by the thick-film technique. Subsequently, the components 28 and the piezoresistive measuring element 19 are applied, as in FIG. 1. In the case of this embodiment, it is possible to do without the adhesive bond between the base 20 of $Al_2O_3$ substrate and the counterbearing 22.

In the exemplary embodiments according to FIG. 6 and FIG. 7, the hybrid 21 is arranged in the axial direction of the pressure sensor 11. Although this makes the pressure sensor 11 longer in the axial direction, a particularly narrow construction of the pressure sensor 11 is possible. As a result, the pressure sensor 11 can be adapted in a particularly simple way to special installation situations in the internal-combustion engine. As distinct from the previous exemplary embodiments, the hybrid 21 is just tilted through 90°. For this, the counterbearing is no longer cylindrically designed, but must have on one side surface a flat face 44 on which the hybrid is applied The base of the hybrid is then applied on this side and also on the end face of the counterbearing 22c facing the punch 18. In this case, it is again possible to use a glass layer as the material for the base. However, as in FIG. 7, a flexible Kapton film 45 may also be used as base for the hybrid 21. Kapton films are commercially available and have the following properties: high temperature resistance, good dielectric strength and high flexibility.

It will be understood that each of the elements described above, or two or more together, may also find a useful application in other types of constructions differing from the types described above.

While the invention has been illustrated and described as embodied in a pressure sensor for detecting the pressure in the combustion chamber of internal-combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A pressure sensor for detecting pressure in a combustion chamber of internal combustion engines, comprising a housing having an opening; a sensor element composed of a piezo-resistive material and arranged in said housing; a diaphragm fixedly mounted on said housing in the region of said opening of said housing so as to close said opening; a punch introducing a pressure to be determined onto said sensor element and located in said housing between said diaphragm and said sensor element, said punch having an end which bears against an inner surface of said diaphragm, said punch also having a counterbearing; a hybrid having a base; and a preprocessing circuit having electronic components, said sensor element, said hybrid with its base and said electronic components of said preprocessing circuit being located on said counterbearing of said punch.

2. A pressure sensor as defined in claim 1, wherein said sensor element is arranged on said base of said hybrid.

3. A pressure sensor as defined in claim 1, wherein said counterbearing has a side facing said punch, said hybrid being arranged on said side of said counterbearing.

4. A pressure sensor as defined in claim 1, wherein said hybrid is applied in an axial direction of said pressure sensor on a surface of said counterbearing.

5. A pressure sensor as defined in claim 1, wherein said base of said hybrid is composed of $Al_2O_3$.

6. A pressure sensor as defined in claim 1, wherein said base of said hybrid is composed of a Kapton film.

7. A pressure sensor as defined in claim 1, wherein said base of said hybrid is composed of SiCrAl.

8. A pressure sensor as defined in claim 1; and further comprising an insulation layer located between said base of said hybrid and said components.

9. A pressure sensor as defined in claim 8, wherein said hybrid is composed of SiCrAl, while said insulation layer is composed of glass.

10. A pressure sensor as defined in claim 1, wherein said counterbearing is composed of SiCrAl and serves as said base of said hybrid.

11. A pressure sensor as defined in claim 1; and further comprising means for bonding said electronic components.

12. A pressure sensor as defined in claim 11, wherein said bonding means include bonding wires and thick-film conductor tracks.

13. A pressure sensor as defined in claim 1, wherein said piezoresistive element has resistive films which are printed in direction of a current flowing through said resistive films.

14. A pressure sensor as defined in claim 1, wherein said punch is composed of glass ceramic.

15. A pressure sensor as defined in claim 1, wherein said counterbearing is pressed into said bearing.

* * * * *